US012781886B2

(12) United States Patent
Daimon et al.

(10) Patent No.: US 12,781,886 B2
(45) Date of Patent: Nov. 3, 2026

(54) PIPE JOINT

(71) Applicant: SANOH INDUSTRIAL CO., LTD., Tokyo (JP)

(72) Inventors: Satoshi Daimon, Koga (JP); Yuji Nakamoto, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 19/123,834

(22) PCT Filed: Aug. 14, 2023

(86) PCT No.: PCT/JP2023/029440
§ 371 (c)(1),
(2) Date: Apr. 24, 2025

(87) PCT Pub. No.: WO2024/089982
PCT Pub. Date: May 2, 2024

(65) Prior Publication Data
US 2026/0185640 A1 Jul. 2, 2026

(30) Foreign Application Priority Data
Oct. 25, 2022 (JP) ................................ 2022-170914

(51) Int. Cl.
*F16L 21/00* (2006.01)
*F16L 19/02* (2006.01)
(Continued)

(52) U.S. Cl.
CPC ......... *F16L 21/005* (2013.01); *F16L 19/0218* (2013.01); *F16L 19/025* (2013.01);
(Continued)

(58) Field of Classification Search
CPC ....... F16L 21/005; F16L 21/06; F16L 21/065; F16L 21/08
(Continued)

(56) References Cited

U.S. PATENT DOCUMENTS 5,028,077 A 7/1991 Hurst
5,039,137 A * 8/1991 Cankovic ............... F16L 25/14 285/236
(Continued)

FOREIGN PATENT DOCUMENTS

DE 102018212593 A1 10/2019
JP S64-39906 U 3/1989
(Continued)

OTHER PUBLICATIONS

Search Report and Written Opinion in International Application No. PCT/JP2023/029440 dated Oct. 31, 2023, 10 pages.
(Continued)

*Primary Examiner* — David Bochna
(74) *Attorney, Agent, or Firm* — MARSHALL, GERSTEIN & BORUN LLP

(57) ABSTRACT

A pipe joint includes a joint body, a pipe insertion part into which a pipe is to be inserted, an annular tightening member and a restriction part. The pipe insertion part is configured by a resin material with greater softness and elasticity than a material configuring the joint body, and is integrated with the joint body. The tightening member is disposed at an outer circumferential of the pipe insertion part and tightens the pipe insertion part from the outer circumferential side thereof by a tightening operation. The restriction part is provided at the pipe insertion part and, before the tightening operation, blocks movement of the tightening member in an axial direction of the pipe insertion part relative to the pipe insertion part and restricts rotation of the tightening member
(Continued)

in the circumferential direction of the pipe insertion part relative to the pipe insertion part.

9 Claims, 11 Drawing Sheets

(51) Int. Cl.

| | |
|---|---|
| ***F16L 19/025*** | (2006.01) |
| ***F16L 21/06*** | (2006.01) |
| ***F16L 21/08*** | (2006.01) |
| ***F16L 25/00*** | (2006.01) |
| ***F16L 37/091*** | (2006.01) |
| ***F16L 37/092*** | (2006.01) |
| ***F16L 37/098*** | (2006.01) |
| ***F16L 37/113*** | (2006.01) |
| ***F16L 37/56*** | (2006.01) |
| ***F16L 55/16*** | (2006.01) |

(52) U.S. Cl.
CPC ............... *F16L 21/06* (2013.01); *F16L 21/08* (2013.01); *F16L 25/0045* (2013.01); *F16L 37/091* (2013.01); *F16L 37/0925* (2013.01); *F16L 37/0985* (2013.01); *F16L 37/113* (2013.01); *F16L 37/56* (2013.01); *F16L 55/1608* (2013.01)

(58) Field of Classification Search
USPC ........................................................ 285/23
See application file for complete search history.

(56) References Cited

U.S. PATENT DOCUMENTS

| | | | | |
|---|---|---|---|---|
| 5,622,391 A * | 4/1997 | Belik | F16L 33/08 | 285/23 |
| 6,224,066 B1 | 5/2001 | Oetiker | | |
| 2004/0080154 A1* | 4/2004 | Krauss | F16L 33/08 | 285/23 |
| 2005/0172460 A1* | 8/2005 | Geppert | F16L 33/04 | 24/279 |
| 2007/0170721 A1* | 7/2007 | Cook | F16L 33/227 | 285/256 |
| 2018/0045149 A1 | 2/2018 | Williams et al. | | |
| 2020/0124214 A1* | 4/2020 | Morris | F16L 33/10 | |
| 2020/0248846 A1 | 8/2020 | Oba et al. | | |

FOREIGN PATENT DOCUMENTS

| | | |
|---|---|---|
| JP | H01-293217 A | 11/1989 |
| JP | H10-54493 A | 2/1998 |
| JP | 2005-226835 A | 8/2005 |
| JP | 6148607 B2 | 6/2017 |
| WO | WO-2016/022676 A1 | 2/2016 |
| WO | WO-2018/155187 A1 | 8/2018 |

OTHER PUBLICATIONS

Extended European Search Report in EP Application No. 23882198.7 dated Aug. 5, 2026, 38 pages.

* cited by examiner

PIPE JOINT

TECHNICAL FIELD

The present disclosure relates to a pipe joint.

BACKGROUND ART

Japanese Patent No. 6148607 discloses a technology in which a reaction force presses an inner circumferential face of a clamp that is in an expanded diameter state in an outward direction of an engaging part, and the inner circumferential face of the clamp at the opposite side thereof from the side that is pressed is abutted against a clamp mounting portion by the reaction force, suppressing rotation of the clamp in the circumferential direction relative to the clamp mounting portion. Movement of the clamp in the axial direction relative to the clamp mounting portion is restrained by a distal end side retaining portion and a body side retaining portion of a pipe.

SUMMARY OF INVENTION

Technical Problem

However, in the technology disclosed in Japanese Patent No. 6148607, a position of the clamp relative to the clamp mounting portion is not stable, due to work vibrations during assembly tasks, the weight of the clamp and so forth. In other words, there is a risk of the clamp moving. If the clamp moves relative to the clamp mounting portion, a task of realigning positions of a hook and projection for a tightening operation of the clamp to positions at which the tightening operation is easy may be necessary.

An object of the present disclosure is to provide a technology that, for a pipe joint at which a pipe insertion part into which a pipe is inserted is tightened from an outer circumferential side by a tightening member, makes a tightening operation of the tightening member easier.

Solution to Problem

A pipe joint according to a first aspect of the present disclosure includes: a joint body; a pipe insertion part into which a pipe is to be inserted, the pipe insertion part being configured by a resin material with greater softness and elasticity than a material configuring the joint body, and the pipe insertion part being integrated with the joint body; an annular tightening member disposed at an outer circumferential of the pipe insertion part, the tightening member tightening the pipe insertion part from an outer circumferential side thereof by a tightening operation; and a restriction part provided at the pipe insertion part, the restriction part: blocking movement relative to the pipe insertion part of the tightening member before the tightening operation in an axial direction of the pipe insertion part, and restricting rotation relative to the pipe insertion part of the tightening member before the tightening operation in a circumferential direction of the pipe insertion part.

Advantageous Effects of Invention

According to the present disclosure as described above, a technology may be provided that, for the pipe joint at which the pipe insertion part into which the pipe is inserted is tightened from an outer circumferential side by the tightening member, makes the tightening operation of the tightening member easier.

DETAILED DESCRIPTION

Figure 1:
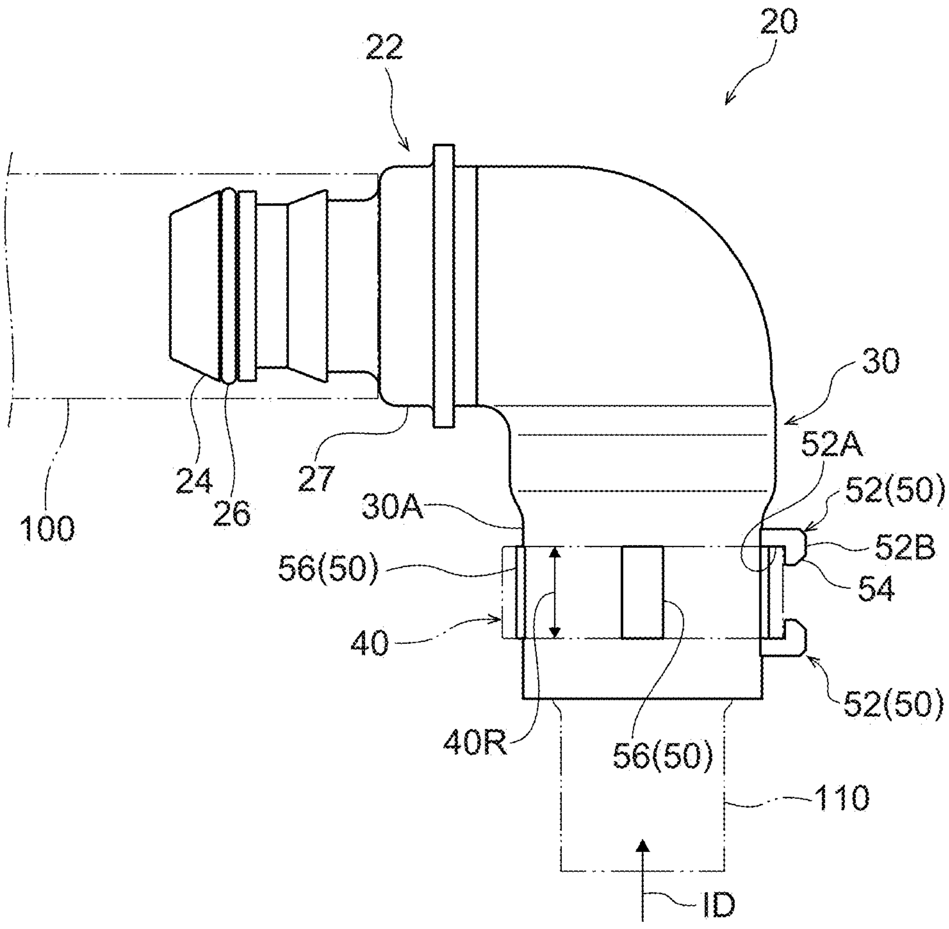
FIG. 1 is a side view of a pipe joint according to a first aspect of the present disclosure.

Below, modes for embodying the present disclosure are described with reference to the drawings. In the drawings, structural elements being indicated with the same reference symbols signifies that those structural elements are the same or similar. In the exemplary embodiment described below, duplicative descriptions and reference symbols may be omitted. The drawings used for the descriptions below are all schematic illustrations: dimensional relationships of elements, proportions of elements and so forth illustrated in the drawings do not necessarily match reality. Moreover, dimensional relationships of elements, proportions of elements and so forth do not necessarily match between plural drawings.

FIG. 1 to FIG. 7 show a pipe joint 20 according to an exemplary embodiment of the present disclosure. The pipe joint 20 according to the present exemplary embodiment is a joint for joining a resin tube 100 to a connecting pipe 110.

The resin tube 100 according to the present exemplary embodiment is a tube with flexibility that is configured by a resin material with softness and elasticity. The resin tube 100 is an example of a pipe-shaped member of the present disclosure.

The connecting pipe 110 according to the present exemplary embodiment is a pipe configured by a metal material or a stiff resin material or the like. The connecting pipe 110 includes an annular protruding part 112 at a distal end portion of the connecting pipe 110. The annular protruding part 112 is formed continuously in the circumferential direction of the connecting pipe 110 at an outer circumferential of the distal end portion. The connecting pipe 110 may also include an annular protruding part at a deeper side relative to the annular protruding part 112 at the distal end portion. The connecting pipe 110 is an example of a pipe of the present disclosure.

Figure 2:
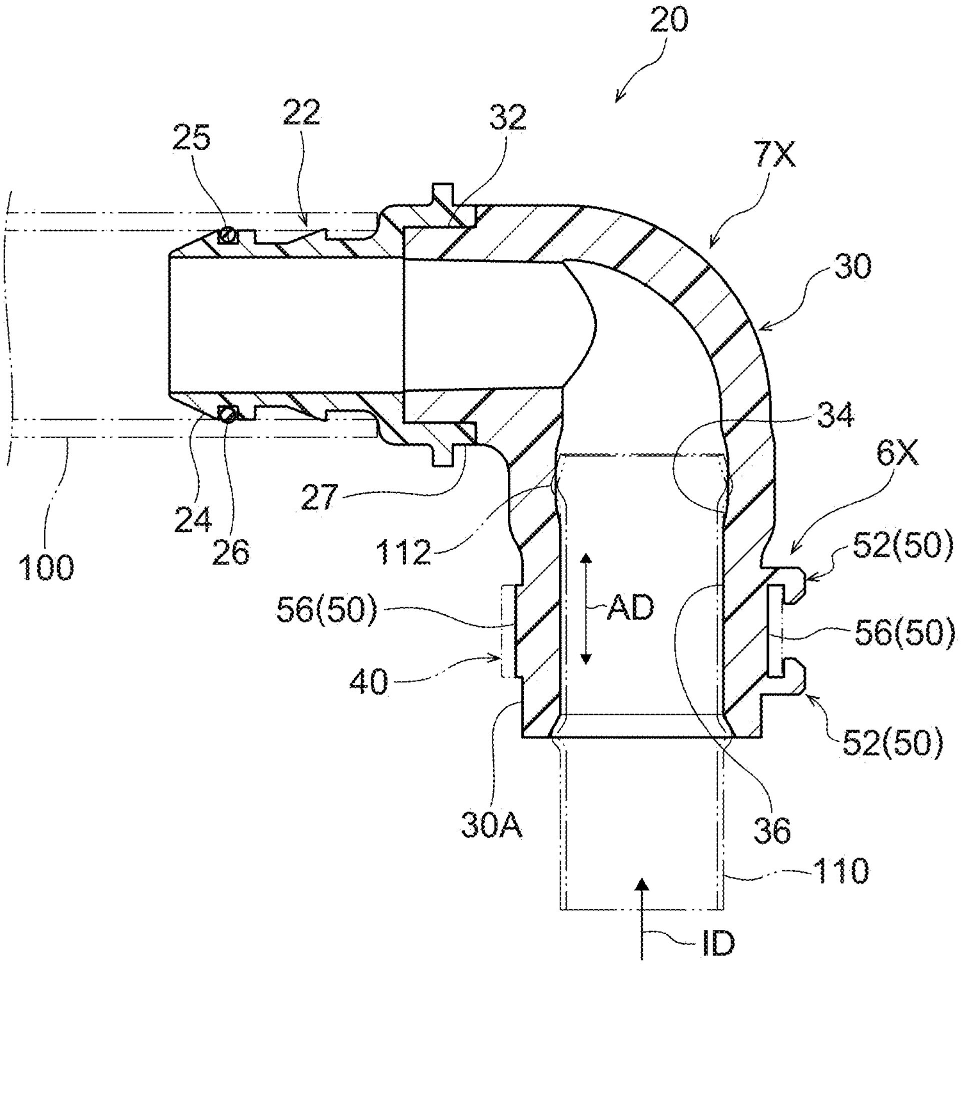
FIG. 2 is a vertical sectional diagram (a sectional diagram cut along an axial direction) of the pipe joint shown in FIG. 1.

As shown in FIG. 2, the pipe joint 20 is provided with a joint body 22, a pipe insertion part 30, a tightening member 40 and a restriction part 50. As is shown in FIG. 1 and FIG. 2, the pipe joint 20 according to the present exemplary embodiment is an "L"-shaped pipe joint.

The pipe joint 20 according to the present exemplary embodiment is molded by two-shot molding, with the joint body 22 and the pipe insertion part 30 being integrated. The present disclosure is not limited thus; insert-molding is also applicable provided the joint body 22 and the pipe insertion part 30 may be integrated. Alternatively, the joint body 22 and the pipe insertion part 30 may be respectively separately molded and then integrated by welding or the like.

Joint Body

The joint body 22 structures a main body portion of the pipe joint 20. As shown in FIG. 2, the joint body 22 is a member in which a resin material is formed in a circular tube shape. A pipe connection part 24, which is to be connected to the resin tube 100, is formed at one end side (the left side in FIG. 2) of an axial direction of the joint body 22. In other words, the joint body 22 is equipped with the pipe connection part 24 that is to be connected to the resin tube.

As shown in FIG. 2, an annular groove 25 is formed at an outer circumferential of a distal end portion of the pipe connection part 24. The groove 25 extends in the circumferential direction. An O-ring 26 is accommodated in the groove 25. The resin tube 100 is connected to the joint body 22 by the pipe connection part 24 being inserted into the resin tube 100. Thus, the resin tube 100 is connected to the pipe joint 20.

A bond portion 27 is formed at the other end side of the joint body 22 in the axial direction (the right side in FIG. 2). The pipe insertion part 30 is bonded with the joint body 22 at the bond portion 27. An inner diameter and outer diameter of the bond portion 27 are greater than an inner diameter and outer diameter of the pipe insertion part 30. A bond portion 32 of the pipe insertion part 30 is disposed at the inner periphery side of the bond portion 27. The inner periphery of the bond portion 27 is bonded with an outer circumferential of the bond portion 32. In the present exemplary embodiment, the joint body 22 and the pipe insertion part 30 are molded by two-shot molding. Therefore, the respective materials are compatible (that is, mix well) at boundary surfaces of the bond portion 27 and bond portion 32 and bonding strength is improved.

As the resin material configuring the joint body 22, with regard to strength, it is preferable to employ, for example, a fiber-reinforced resin in which glass fibers are blended in a polypropylene resin, a polyamide resin or a polyphenylene sulfide resin.

The joint body 22 according to the present exemplary embodiment is configured by a fiber-reinforced resin in which glass fibers are blended in a polypropylene resin.

Pipe Insertion Part

As shown in FIG. 1 and FIG. 2, the pipe insertion part 30 structures a portion of the pipe joint 20 into which the connecting pipe 110 is inserted. The pipe insertion part 30 is configured by a resin material with greater softness and elasticity than the material configuring the joint body 22. More specifically, the pipe insertion part 30 is a member in which a resin material with greater softness and elasticity than the resin material configuring the joint body 22 is formed in a circular tube shape. The pipe insertion part 30 according to the present exemplary embodiment structures an "L"-shaped inflection portion (in other words, a curved pipe portion) and one linear portion (in other words, a straight pipe portion) of the pipe joint 20. The joint body 22 structures another linear portion (in other words, a straight pipe portion) of the pipe joint 20.

As shown in FIG. 2, the above-mentioned bond portion 32 is formed at one end side (the left side in FIG. 2) of the pipe insertion part 30 in the axial direction. The inner circumferential of the bond portion 27 is bonded with the outer circumferential of the bond portion 32.

The connecting pipe 110 is connected to the pipe insertion part 30 by the connecting pipe 110 being inserted (pushed) into the inner side of the pipe insertion part 30 from the other end side in the axial direction of the pipe insertion part 30 (the lower side in FIG. 2).

The pipe insertion part 30 is provided with an expanded diameter part 34 at the deeper side in the insertion direction of the connecting pipe 110 relative to a tightened region 40R that is tightened by the tightening member 40, which is described below. The inner diameter of the pipe insertion part 30 widens at the expanded diameter part 34. More specifically, a portion of the inner circumferential of the pipe insertion part 30 corresponding with at least the tightened region 40R is a constant diameter part 36. The expanded diameter part 34 is provided in a region at the deeper side in the insertion direction of the connecting pipe 110 relative to the constant diameter part 36. The expanded diameter part 34 is greater in diameter than the constant diameter part 36. The insertion direction of the connecting pipe 110 is the direction of arrow ID in FIG. 2. The tightened region 40R is a region of the pipe insertion part 30 that is tightened by the tightening member 40. Therefore, when the tightening member 40 is in contact with an outer circumferential face 30A of the pipe insertion part 30, the tightened region 40R is the breadth of the tightening member 40, and when the tightening member 40 is supported via support parts 56, which are described below, the tightened region 40R is a range (region) of the support parts 56 in the axial direction AD.

As a resin material configuring the pipe insertion part 30, with regard to sealing, it is preferable to employ a thermoplastic elastomer or a thermosetting elastomer. Thermoplastic elastomers that may be employed include, for example, olefin elastomers (TPO), styrene elastomers (TPS), polyvinyl chloride elastomers (TPVC), polyurethane elastomers (TPU), polyester elastomers (TPC), polyamide elastomers (TPA) and the like.

Thermosetting elastomers that may be employed include, for example, vulcanized rubbers, ethylene propylene rubbers, fluoride rubbers, fluorosilicone rubbers, hydrogenated nitrile rubbers and the like.

In the present exemplary embodiment, an olefin elastomer (TPO) is employed as a thermoplastic elastomer configuring the pipe insertion part 30.

In the present exemplary embodiment, because a fiber-reinforced resin in which glass fibers are blended in a polypropylene resin is used for molding of the joint body 22, this fiber-reinforced resin mixes well at the time of two-shot molding with the pipe insertion part 30 that is formed of an olefin elastomer (TPO) containing a polypropylene resin. As a result, the joint body 22 and the pipe insertion part 30 are solidly bonded (integrated). More specifically, during the two-shot molding, polymer chains of the polypropylene resins included in the respective materials of the joint body 22 and pipe insertion part 30 are entangled with one another, as a result of which the joint body 22 and the pipe insertion part 30 are solidly bonded.

Although the joint body 22 and pipe insertion part 30 are molded by two-shot molding in the present exemplary embodiment, molding by insert-molding is also applicable.

Insert-molding provides similar effects to two-shot molding.

Tightening Member

The tightening member 40 is a member that tightens the pipe insertion part 30 from the outer circumferential side thereof. By tightening, from the outer circumferential side, the pipe insertion part 30 into which the connecting pipe 110 has been inserted, the tightening member 40 functions to pressure weld the pipe insertion part 30 to the connecting pipe 110 and put the pipe insertion part 30 and the connecting pipe 110 into area contact.

Figure 3:
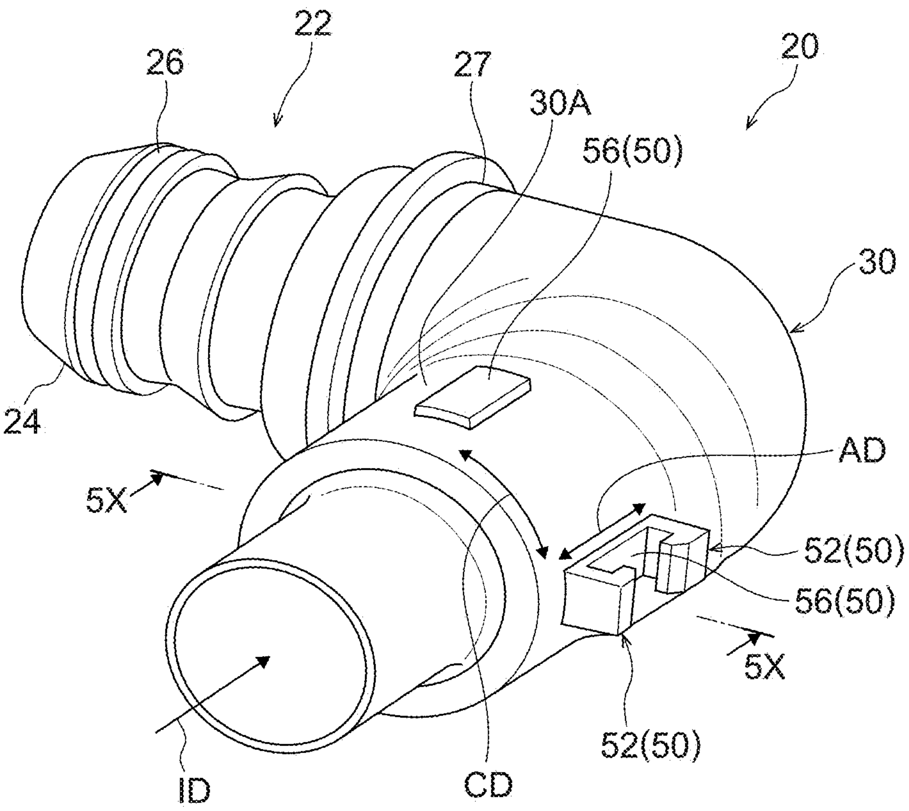
FIG. 3 is a perspective view of the pipe joint shown in FIG. 1 (before being equipped with a tightening member).

As shown in FIG. 2 and FIG. 3, the tightening member 40 has an annular shape and is disposed at the outer circumferential of the pipe insertion part 30. The tightening member 40 tightens the pipe insertion part 30 from the outer circumferential side by a tightening operation. More specifically, the tightening member 40 is a circular resilient spring provided with tabs 42 at both ends. The tightening member 40 is maintained in an expanded diameter state by catch parts (not shown in the drawings) provided at both end sides of the tightening member 40 catching on one another. When the tabs 42 are operated, the catching of the catch parts with one another is released and the tightening member 40 restores to its original diameter. The meaning of the term "tightening operation of the tightening member 40" is intended to include operation of the tabs 42 to release the catching of the catch parts with one another in order to restore the tightening member 40 in the expanded diameter state to its original diameter.

The inner diameter of the tightening member 40 before the tightening operation (the inner diameter in the expanded diameter state) is greater than the outer diameter of the portion of the pipe insertion part 30 at which the tightening member 40 is disposed, such that the pipe insertion part 30 is not tightened before the connecting pipe 110 is inserted.

With a view to tightening strength, the tightening member 40 according to the present exemplary embodiment is a resilient spring fabricated of metal, but the tightening member 40 is not limited to this structure. Provided tightening strength can be assured, the tightening member 40 may be a resilient spring formed of a resin material.

Restriction Part

The restriction part 50 is a portion provided at the pipe insertion part 30 that restricts movement of the tightening member 40 relative to the pipe insertion part before the tightening operation. The restriction part 50 functions both to block movement of the tightening member 40 in the axial direction of the pipe insertion part 30 relative to the pipe insertion part 30 before the tightening operation and to restrict rotation of the pipe insertion part 30 in the circumferential direction of the pipe insertion part 30 before the tightening operation. Below, the axial direction of the pipe insertion part 30 is indicated by the reference symbol AD and the circumferential direction of the pipe insertion part 30 is indicated by the reference symbol CD.

As shown in FIG. 1 to FIG. 3, the restriction part 50 includes protruding parts 52 and the support parts 56.

Figure 5:
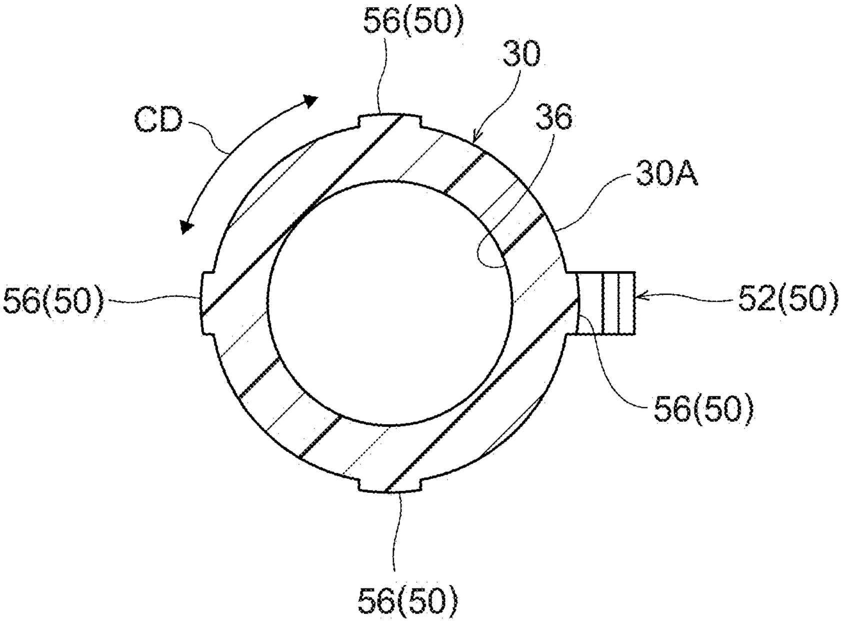
FIG. 5 is a sectional diagram cut along line 5X-5X in FIG. 3.
Figure 6:
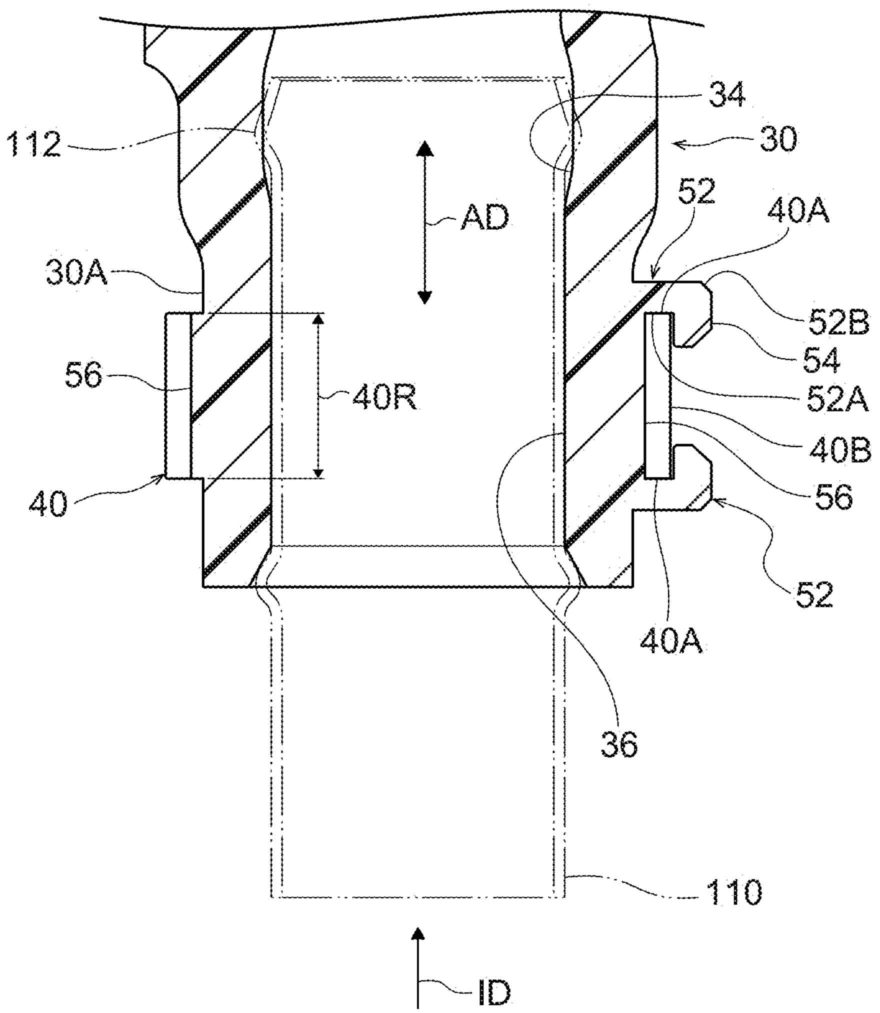
FIG. 6 is a magnified diagram of a region indicated by arrow 6X in FIG. 2.
Figure 7:
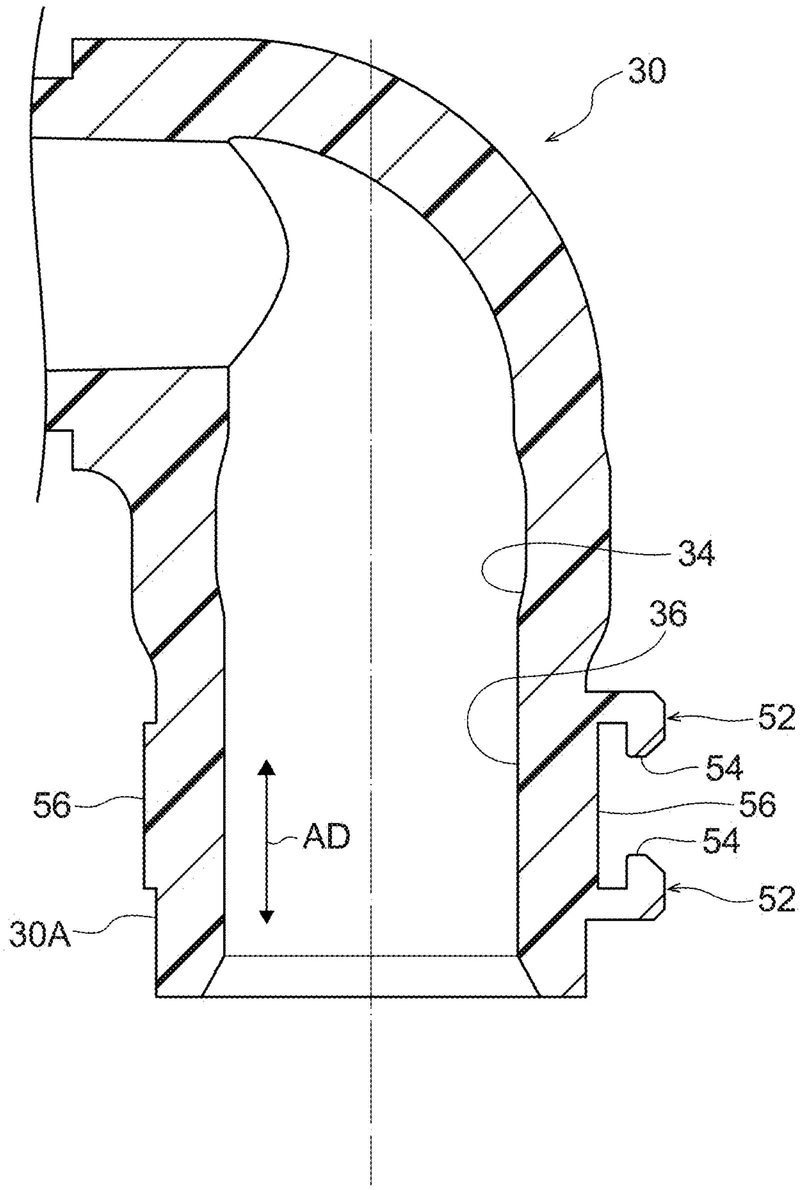
FIG. 7 is a magnified diagram of a region indicated by arrow 7X in FIG. 2.

As shown in FIG. 3, FIG. 5 and FIG. 6, the protruding parts 52 protrude from an outer circumferential face 30A of the pipe insertion part 30 and are provided spaced apart in the axial direction AD. In the present exemplary embodiment, a pair of the protruding parts 52 are disposed on the outer circumferential face 30A of the pipe insertion part 30, opposing one another in the axial direction AD. In other words, the pair of protruding parts 52 are adjacent to one another in the axial direction AD.

As shown in FIG. 6, the tightening member 40 is disposed between the pair of protruding parts 52. Two width direction end portions 40A of the tightening member 40 make respective contact the pair of protruding parts 52. More specifically, the two width direction end portions 40A of the tightening member 40 make contact with respective mutually opposing side wall faces 52A of the pair of protruding parts 52. As a result, movement of the tightening member 40 before the tightening operation in the axial direction AD relative to the pipe insertion part 30 is blocked.

As shown in FIG. 5 and FIG. 6, projecting parts 54 that project in mutually opposite directions are provided at respective tip portions 52B of the pair of protruding parts 52. More specifically, one projecting part 54 is provided at one of the protruding parts 52 to project from the tip portion 52B toward the tip portion 52B of the other protruding part 52, and another projecting part 54 is provided at the other protruding part 52 to project from the tip portion 52B toward the tip portion 52B of the one protruding part 52. However, the present disclosure is not limited to this structure; the projecting parts 54 may project from protrusion direction middle portions of the protruding parts 52.

As shown in FIG. 6, the projecting parts 54 are in contact with an outer circumferential face 40B of the tightening member 40 before the tightening operation.

Figure 4:
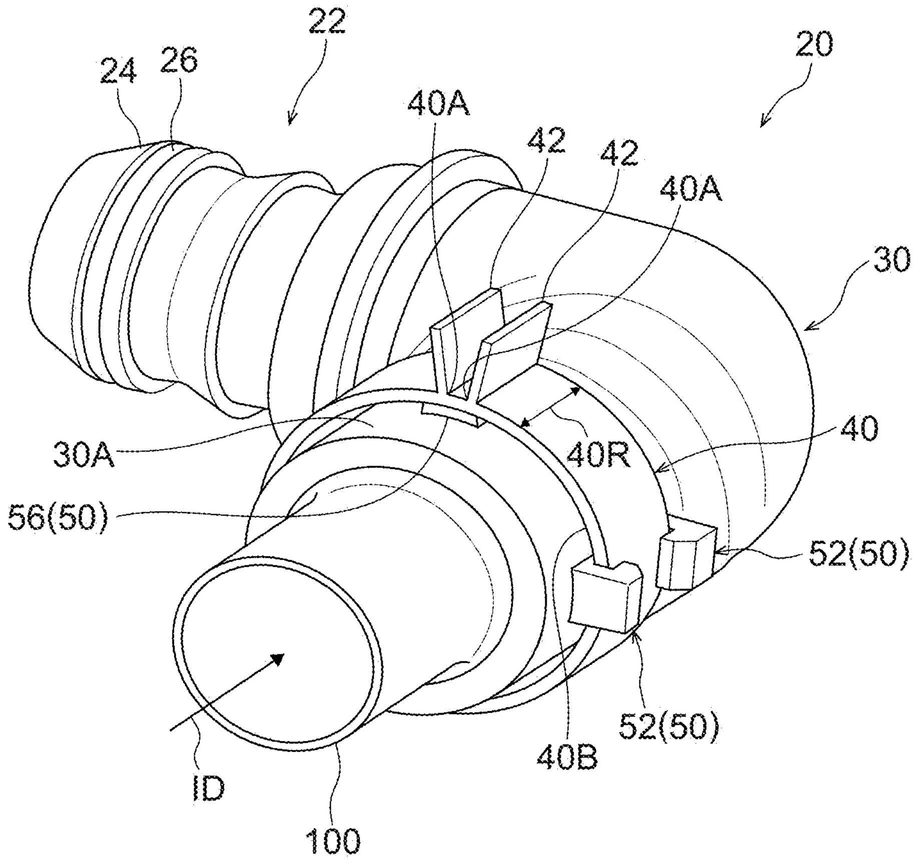
FIG. 4 is a perspective view of the pipe joint shown in FIG. 1.

As shown in FIG. 3 and FIG. 5, the support parts 56 are raised portions rising from the outer circumferential face 30A of the pipe insertion part 30, which are provided spaced apart in the circumferential direction of the pipe insertion part 30. More specifically, the support parts 56 are provided at equal intervals in the circumferential direction of the pipe insertion part 30. As shown in FIG. 4 and FIG. 6, the support parts 56 support the tightening member 40 from an inner circumferential side thereof before the tightening operation.

One of the plural support parts 56 is provided between the pair of protruding parts 52. Therefore, a portion of the tightening member 40 that is disposed between the pair of protruding parts 52 is sandwiched in a thickness direction thereof by this support part 56 and the projecting parts 54 before the tightening operation.

Now, operation and effects of the present exemplary embodiment are described.

With the pipe joint 20 according to the present exemplary embodiment, the connecting pipe 110 is inserted into the pipe insertion part 30 and the tightening operation is carried out on the untightened tightening member 40. Thus, the pipe insertion part 30 into which the connecting pipe 110 has been inserted is tightened from the outer circumferential side and the connecting pipe 110 is connected to the pipe insertion part 30.

In this pipe joint 20, movement of the tightening member 40 in the axial direction AD relative to the pipe insertion part 30 before the tightening operation is blocked by the restriction part 50, and rotation of the tightening member 40 in the circumferential direction CD of the pipe insertion part 30 before the tightening operation is restricted by the restriction part 50. Therefore, when the tightening operation is being carried out on the untightened tightening member 40, the position of the tightening member 40 (more specifically, positions of the tabs 42) relative to the pipe insertion part 30 is consistent. That is, because movement of the tightening member 40 relative to the pipe insertion part 30 is suppressed, the tightening operation of the tightening member 40 may be made easier. For example, when a tool such as pliers or the like is used for the tightening operation of the untightened tightening member 40, positions of the tabs 42 of the tightening member 40 relative to the pipe insertion part 30 are not moved and are consistent. Therefore, a worker may grip the tabs 42 to perform the tightening operation by using a tool such as the pliers or the like in one hand. Because the tightening operation of the untightened tightening member 40 of the pipe joint 20 according to the present exemplary embodiment may be carried out with just one hand in this way, the demands of on-site pipe connection tasks are moderated.

According to the pipe joint 20 according to the present exemplary embodiment as described above, the tightening operation of the tightening member 40 may be made easier than in, for example, a structure in which the tightening member 40 may move relative to the pipe insertion part 30 before the tightening operation.

In the pipe joint 20 according to the present exemplary embodiment, because the two width direction end portions 40A of the tightening member 40 are in respective contact the pair of protruding parts 52, movement of the tightening member 40 before the tightening operation in the axial direction AD relative to the pipe insertion part 30 is blocked by the protruding parts 52. Furthermore, rotation of the tightening member 40 before the tightening operation in the circumferential direction CD relative to the pipe insertion part 30 is restricted by friction between the two width direction end portions 40A of the tightening member 40 and the side wall faces 52A of the pair of protruding parts 52.

According to the pipe joint 20 according to the present exemplary embodiment, with the simple structure in which the pair of protruding parts 52 that are spaced apart in the axial direction AD are provided at the outer circumferential face 30A of the pipe insertion part 30, both movement of the tightening member 40 in the axial direction AD relative to the pipe insertion part 30 before the tightening operation may be blocked and rotation of the tightening member 40 in the circumferential direction CD may be restricted.

In the pipe joint 20 according to the present exemplary embodiment, the respective projecting parts 54 are provided at the pair of protruding parts 52, and the tightening member 40 is disposed between the pair of projecting parts 54 and the outer circumferential face 30A. Therefore, the tightening member 40 before the tightening operation, whose diameter has not been reduced, is restricted from riding over the protruding parts 52 by the pair of projecting parts 54.

In the pipe joint 20 according to the present exemplary embodiment, because the projecting parts 54 are in contact with the outer circumferential face 40B of the tightening member 40 before the tightening operation, rotation of the tightening member 40 in the circumferential direction CD relative to the pipe insertion part 30 before the tightening operation is restricted by friction between the outer circumferential face 40B of the untightened tightening member 40 and the projecting parts 54.

In the pipe joint 20 according to the present exemplary embodiment, because the tightening member 40 is supported from the inner circumferential side by the plural support parts 56 before the tightening operation, rotation of the tightening member 40 in the circumferential direction CD relative to the pipe insertion part 30 before the tightening operation is restricted by friction between the plural support parts 56 and the tightening member 40.

In the pipe joint 20 according to the present exemplary embodiment, because one of the support parts 56 is provided between the pair of protruding parts 52, the tightening member 40 is sandwiched in the thickness direction by the projecting parts 54 and this support part 56. Therefore, rotation of the tightening member 40 in the circumferential direction CD relative to the pipe insertion part 30 before the tightening operation is further restricted by friction between the support part 56 and the tightening member 40 and friction between the projecting parts 54 and the tightening member 40.

In the pipe joint 20 according to the present exemplary embodiment, when, for example, the connecting pipe 110 including the annular protruding part 112 at the distal end portion is inserted into the pipe insertion part 30, a resistance force against the insertion of the connecting pipe 110 decreases when the annular protruding part 112 reaches the expanded diameter part 34, and a load during the pipe insertion is reduced. That is, an insertion force required for the insertion of the connecting pipe 110 is reduced. Therefore, in a task of pipe insertion into the pipe insertion part 30, an insertion amount of the connecting pipe 110—and thus whether the connecting pipe 110 has been inserted to a predetermined position—is more easily understood. That is, when the annular protruding part 112 reaches the expanded diameter part 34, a click sensation of completing the insertion of the connecting pipe 110 is provided. As a result, an insertion completion position of the connecting pipe 110 into the pipe insertion part 30 is consistent. Therefore, sealing between the connecting pipe 110 and the pipe insertion part 30 when the tightening member 40 tightens the pipe insertion part 30, into which the connecting pipe 110 has been inserted, from the outer circumferential side is consistent.

In the pipe joint 20 according to the present exemplary embodiment, because the constant diameter part 36 is the portion of the inner circumferential of the pipe insertion part 30 that corresponds with at least the tightened region 40R that is tightened by the tightening member 40, the inner circumferential face of the pipe insertion part 30 that is tightened by the tightening member 40 is more likely to make area contact with the outer circumferential face of the inserted connecting pipe 110 along the whole circumferential. Therefore, sealing between the connecting pipe 110 and the pipe insertion part 30 is improved.

In the pipe joint 20 according to the present exemplary embodiment, because the pipe insertion part 30 is configured by the thermoplastic elastomer, sealing between the connecting pipe 110 and the pipe insertion part 30 may be assured. Further, because the pipe insertion part 30 is configured by the thermoplastic elastomer, the joint body 22 and the pipe insertion part 30 may be integrated at the time of molding of the pipe joint 20 (the time of two-shot molding) more easily than if, for example, the pipe insertion part 30 is configured by a thermosetting elastomer.

In the pipe joint 20 according to the present exemplary embodiment, connecting the resin tube 100 with the pipe connection part 24 provided at the joint body 22, inserting the connecting pipe 110 into the pipe insertion part 30, and tightening the tightening member 40 to tighten the pipe insertion part 30 from the outer circumferential side puts the resin tube 100 and the connecting pipe 110 into fluid communication. Thus, according to the pipe joint 20 described above, the resin tube 100 and the connecting pipe 110 may be put into fluid communication by an easy task.

Figure 8:
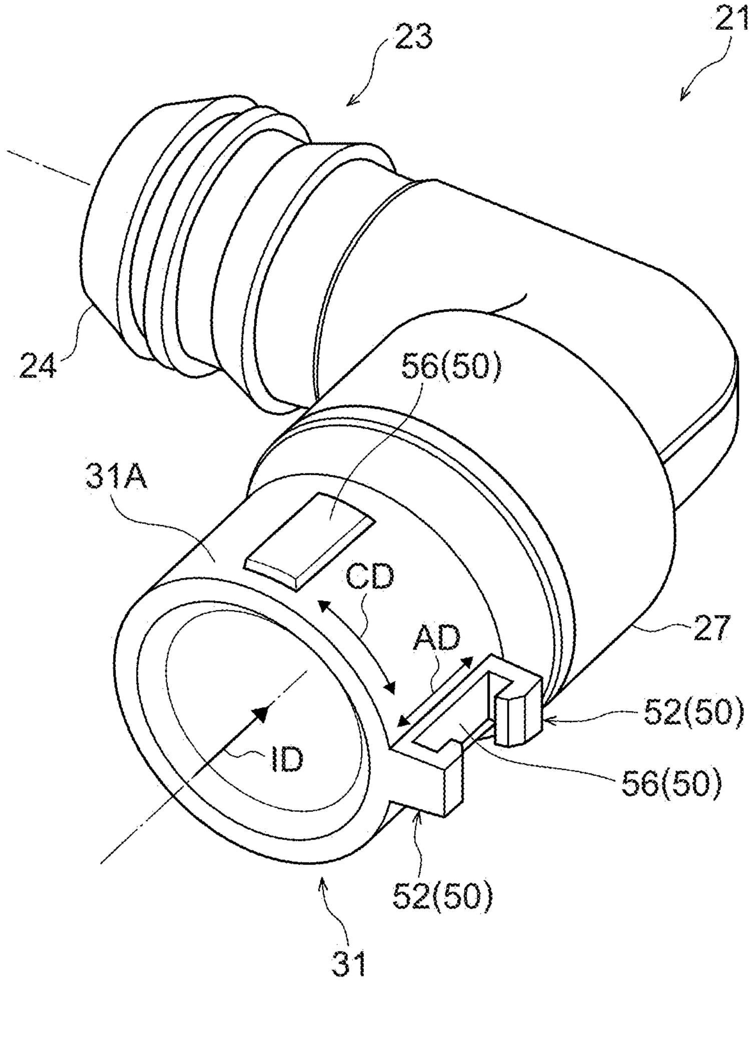
FIG. 8 is a perspective view (a perspective view corresponding to FIG. 3) of a pipe joint according to an alternative embodiment of the present disclosure.
Figure 9:
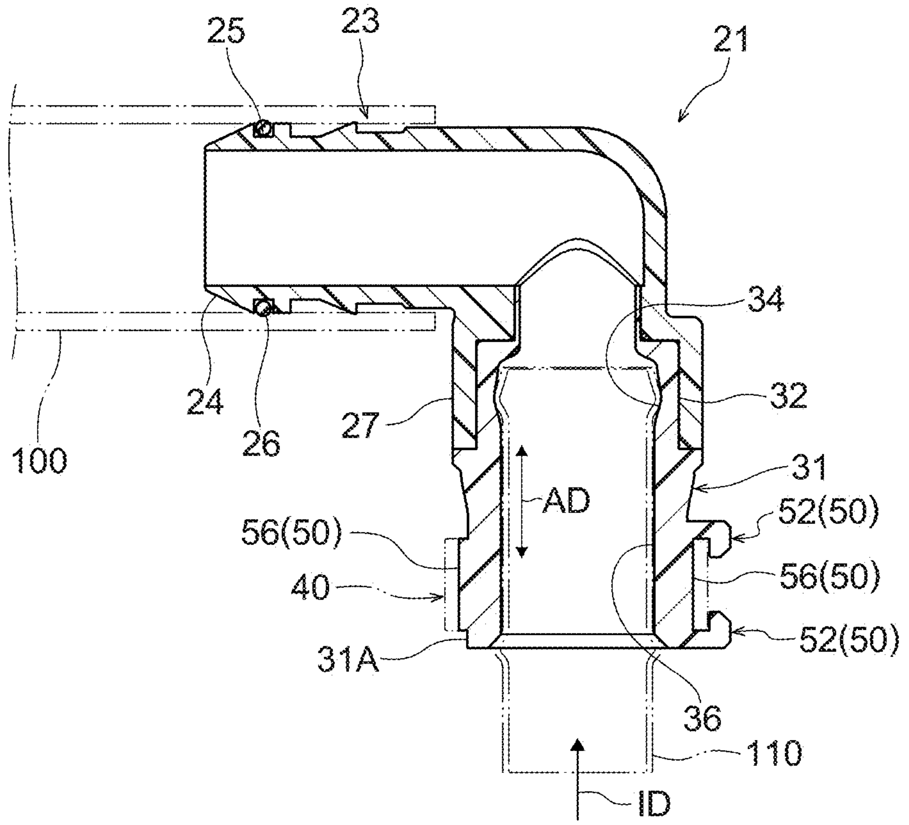
FIG. 9 is a vertical sectional diagram (a vertical sectional diagram corresponding to FIG. 2) of the pipe joint shown in FIG. 8.

In the exemplary embodiment described above, the pipe insertion part 30 structures the "L"-shaped inflection portion (in other words, curved pipe portion) and the one linear portion (in other words, straight pipe portion) of the pipe joint 20, and the joint body 22 structures the other linear portion (in other words, straight pipe portion) of the pipe joint 20. However, the present disclosure is not limited thus. For example, as in a pipe joint 21 illustrated in FIG. 8 and FIG. 9, a pipe insertion part 31 may structure one linear portion (in other words, straight pipe portion) of the "L"-shaped pipe joint 20, and a joint body 23 may structure the inflection portion (in other words, curved pipe portion) and another linear portion (in other words, straight pipe portion) of the pipe joint 20. The pipe insertion part 31 and joint body 23 have similar structures to the pipe insertion part 30 and joint body 22 according to the exemplary embodiment described above apart from their shapes. The reference symbol 31A indicates an outer circumferential face of the pipe insertion part 31.

Figure 10:
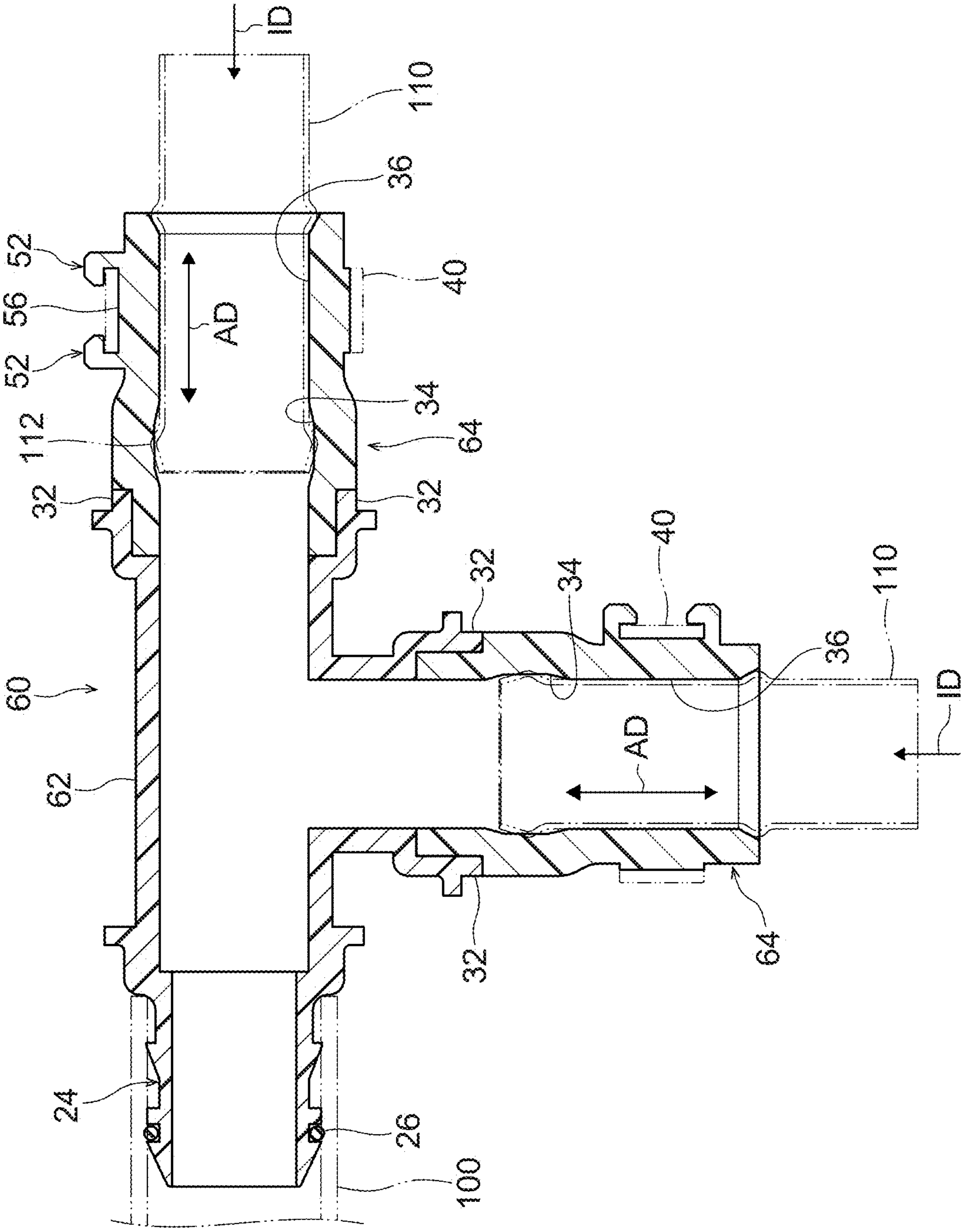
FIG. 10 is a vertical sectional diagram of a pipe joint according to another alternative embodiment of the present disclosure.
Figure 11:
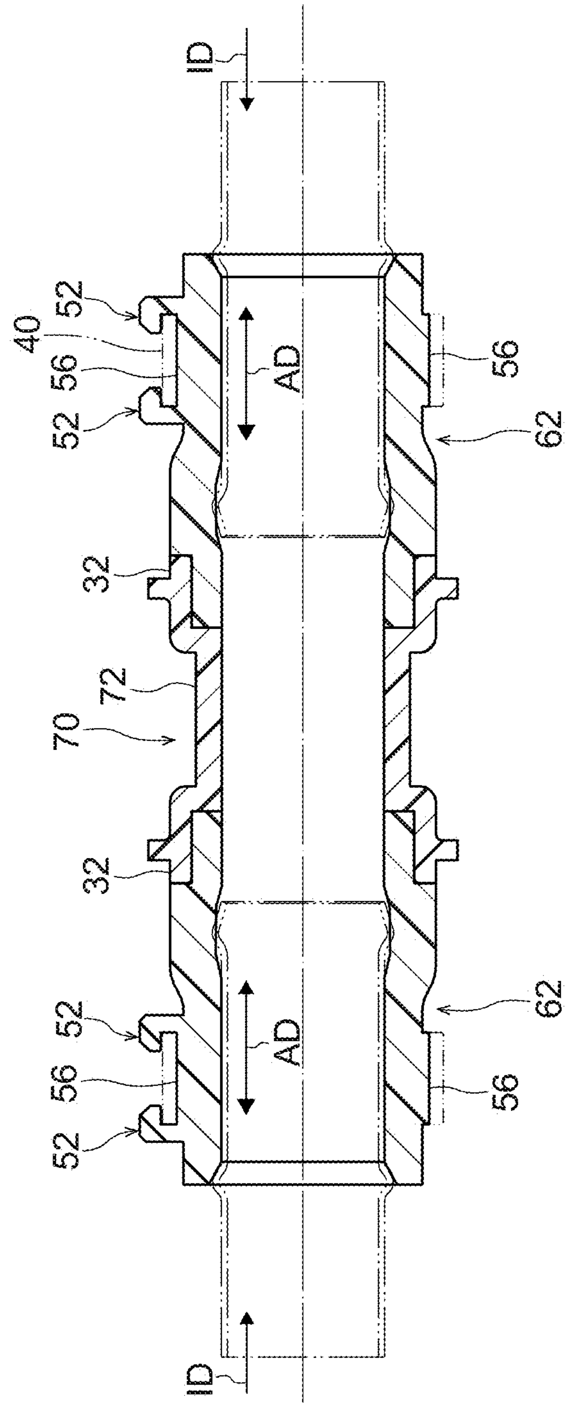
FIG. 11 is a vertical sectional diagram of a pipe joint according to yet another alternative embodiment of the present disclosure.

In the exemplary embodiment described above, the pipe joint 20 has an "L" shape, but the present disclosure is not limited to this structure. For example, a pipe joint 60 as illustrated in FIG. 10 may have a "T" shape, and a pipe joint 70 as illustrated in FIG. 11 may have a straight shape. As shown in FIG. 10, the pipe joint 60 is provided with a "T"-shaped joint body 62, the pipe connection part 24 is provided at a distal end side of one branch part of the joint body 62, and linear (straight pipe-shaped) pipe insertion parts 64 are respectively integrated at distal end sides of the other two branch parts. Meanwhile, as shown in FIG. 11, the pipe joint 70 is provided with a linear (straight pipe) joint body 72, and the aforementioned pipe insertion parts 64 are respectively integrated at the two end sides of the joint body 72. Structures that are provided with plural pipe insertion parts as in the pipe joint 60 and the pipe joint 70 are applicable to the present disclosure. The pipe insertion part 30 described above may be employed at the pipe joint 60 and the pipe joint 70.

In the exemplary embodiment described above, one pair of the protruding parts 52 is provided at the outer circumferential face 30A of the pipe insertion part 30, but the present disclosure is not limited thus. For example, plural pairs of the protruding parts 52 may be provided at the outer circumferential face 30A of the pipe insertion part 30, spaced apart in the circumferential direction. The plural pairs of protruding parts 52 may be provided at equal intervals in the circumferential direction of the outer circumferential face 30A of the pipe insertion part 30. When plural pairs of the protruding parts 52 are provided, the support parts 56 may be provided between the respective pairs of protruding parts 52.

In the exemplary embodiment described above, the annular protruding part 112 is provided at the distal end portion of the connecting pipe 110, but the present disclosure is not limited thus. The annular protruding part 112 at the distal end portion of the connecting pipe 110 need not be provided.

In the foregoing, an exemplary embodiment of the present disclosure has been illustrated and the exemplary embodiment has been described. However, this embodiment is an example; numerous modifications may be embodied within a scope not departing from the gist of the disclosure. It will be clear that the technical scope of the present disclosure is not to be limited by the exemplary embodiment.

The following supplementary notes are disclosed in relation to the exemplary embodiments described above.

Supplementary Note 1

A pipe joint includes:

a joint body;

a pipe insertion part into which a pipe is to be inserted, the pipe insertion part being configured by a resin material with greater softness and elasticity than a material configuring the joint body, and the pipe insertion part being integrated with the joint body;

an annular tightening member disposed at an outer circumferential of the pipe insertion part, the tightening member tightening the pipe insertion part from an outer circumferential side thereof by a tightening operation; and a restriction part provided at the pipe insertion part, the restriction part:

blocking movement relative to the pipe insertion part of the tightening member before the tightening operation in an axial direction of the pipe insertion part, and restricting rotation relative to the pipe insertion part of the tightening member before the tightening operation in a circumferential direction of the pipe insertion part.

In the pipe joint according to supplementary note 1, a pipe is inserted into the pipe insertion part and the tightening operation is carried out on the untightened tightening member. Thus, the pipe insertion part into which the pipe has been inserted is tightened from the outer circumferential side, and the pipe is connected to the pipe insertion part.

Before the tightening operation of this pipe joint, movement of the tightening member in the pipe axial direction of the pipe insertion part relative to the pipe insertion part is blocked by the restriction part and rotation of the tightening member in the circumferential direction of the pipe insertion part is restricted by the restriction part. Therefore, when the tightening operation is being carried out on the untightened tightening member, the position of the tightening member relative to the pipe insertion part may be stable (that is, movement of the tightening member may be restricted). As a result, the tightening operation of the tightening member may be made easier.

According to the pipe joint according to supplementary note 1 as described above, the tightening operation of the tightening member may be carried out more easily than in, for example, a structure in which a tightening member may move relative to a pipe insertion part before a tightening operation.

Supplementary Note 2

In the pipe joint according to supplementary note 1, the restriction part includes a pair of protruding parts that protrude from an outer circumferential face of the pipe insertion part and are provided spaced apart in the axial direction, the tightening member is disposed between the pair of protruding parts, and two width direction end portions of the tightening member respectively contact the pair of protruding parts.

In the pipe joint according to supplementary note 2, because the two width direction end portions of the tightening member respectively contact the pair of protruding parts, movement of the tightening member in the axial direction of the pipe insertion part relative to the pipe insertion part before the tightening operation is blocked by the pair of protruding parts. In addition, rotation of the tightening member in the circumferential direction of the pipe insertion part relative to the pipe insertion part before the tightening operation is restricted by friction between the two width direction end portions of the tightening member and the pair of protruding parts.

According to the pipe joint according to supplementary note 2, with the simple structure in which the pair of protruding parts are spaced apart in the axial direction of the outer circumferential face of the pipe insertion part, both movement of the tightening member in the axial direction of the pipe insertion part relative to the pipe insertion part may be blocked and rotation of the tightening member in the circumferential direction of the pipe insertion part may be restricted before the tightening operation.

Supplementary Note 3

In the pipe joint according to supplementary note 2, projecting parts that project in directions towards one another are respectively provided at the pair of protruding parts, and the tightening member is disposed between the pair of projecting parts and the outer circumferential face of the pipe insertion part.

In the pipe joint according to supplementary note 3, the respective projecting parts are provided at the pair of protruding parts, and the tightening member is disposed between the pair of projecting parts and the outer circumferential face of the pipe insertion part. Therefore, before the tightening operation, the tightening member whose diameter has not been reduced is restricted from riding over the protruding parts by the pair of projecting parts.

Supplementary Note 4

In the pipe joint according to supplementary note 3, the projecting parts contact an outer circumferential face of the tightening member before the tightening operation.

In the pipe joint according to supplementary note 4, because the projecting parts contact the outer circumferential face of the tightening member before the tightening operation, rotation of the tightening member in the circumferential direction of the pipe insertion part relative to the pipe insertion part before the tightening operation is restricted by friction between the outer circumferential face of the untightened tightening member and the projecting parts.

Supplementary Note 5

In the pipe joint according to any one of supplementary notes 1 to 4, the restriction part includes support parts that rise from an outer circumferential face of the pipe insertion part, are provided spaced apart in the circumferential direction of the pipe insertion part, and support the tightening member from an inner circumferential side thereof before the tightening operation.

In the pipe joint according to supplementary note 5, because the tightening member is supported from the inner circumferential side by the plural support parts before the tightening operation, rotation of the tightening member before the tightening operation in the circumferential direction of the pipe insertion part relative to the pipe insertion part is restricted by friction between the plural support parts and the tightening member.

Supplementary Note 6

In the pipe joint according to any one of supplementary notes 2 to 4, the restriction part includes support parts that rise from the outer circumferential face of the pipe insertion part, are provided spaced apart in the circumferential direction of the pipe insertion part, and support the tightening member from an inner circumferential side thereof before the tightening operation, and one support part among the plural support parts is provided between the pair of protruding parts.

In the pipe joint according to supplementary note 6, because the tightening member before the tightening operation is supported from the inner circumferential side by the plural support parts, rotation of the tightening member before the tightening operation in the circumferential direction of the pipe insertion part relative to the pipe insertion part is restricted by friction between the plural support parts and the tightening member. In this pipe joint, because the one support part is provided between the pair of protruding parts, the tightening member is sandwiched in a thickness direction thereof by the projecting parts and the support part. Therefore, rotation of the tightening member in the circumferential direction of the pipe insertion part relative to the pipe insertion part before the tightening operation is further suppressed by friction between the support part and the tightening member and friction between the projecting parts and the tightening member.

Supplementary Note 7

In the pipe joint according to any one of supplementary notes 1 to 6, an expanded diameter part at which an inner diameter of the pipe insertion part increases is provided at a portion of the pipe insertion part that is at a deeper side in an insertion direction of the pipe relative to a region to be tightened by the tightening member.

In the pipe joint according to supplementary note 7, when, for example, a pipe with an annular protruding part at a distal end is inserted into the pipe insertion part, a resistance force against insertion of the pipe decreases when the annular protruding part reaches the expanded diameter part, and a load during the pipe insertion is reduced. That is, an insertion force required for the insertion of the pipe is reduced. Therefore, in a task of pipe insertion into the pipe insertion part of the pipe joint described above, an insertion amount of the pipe—and thus whether the pipe has been inserted to a predetermined position—is more easily understood. That is, when the annular protruding part reaches the expanded diameter part, a click sensation of completing the pipe insertion is provided. As a result, an insertion completion position of the pipe into the pipe insertion part is consistent.

Supplementary Note 8

In the pipe joint according to supplementary note 7, an inner circumferential of at least a portion of the pipe insertion part corresponding with the region to be tightened is a constant diameter part.

In the pipe joint according to supplementary note 8, because the portion of the inner circumferential of the pipe insertion part corresponding to at least the region to be tightened by the tightening member is the constant diameter part, the inner circumferential face of the pipe insertion part that is tightened by the tightening member is more likely to make area contact with the outer circumferential face of the inserted pipe along the whole circumferential.

Supplementary Note 9

In the pipe joint according to any one of supplementary notes 1 to 8, the joint body is configured by a fiber-reinforced resin and the pipe insertion part is configured by a thermoplastic elastomer.

In the pipe joint according to supplementary note 9, because the pipe insertion part is configured by the thermoplastic elastomer, sealing between the pipe and the pipe insertion part may be assured. Further, because the pipe insertion part is configured by the thermoplastic elastomer, the joint body and the pipe insertion part may be integrated at a time of molding of the pipe joint more easily than if, for example, the pipe insertion part were configured by a thermosetting elastomer.

Supplementary Note 10

In the pipe joint according to any one of supplementary notes 1 to 9, the joint body includes a pipe connection part to be connected to a pipe-shaped member.

In the pipe joint according to supplementary note 10, connecting the pipe-shaped member with the pipe connection part provided at the joint body, inserting the pipe into the pipe insertion part, and tightening the tightening member to tighten the pipe insertion part from the outer circumferential side puts the pipe-shaped member and the pipe into fluid communication. Thus, according to this pipe joint, the pipe-shaped member and the pipe may be put into fluid communication by an easy task.

The disclosures of Japanese Patent Application No. 2022-170914 filed Oct. 25, 2022 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A pipe joint, comprising:

a joint body;

a pipe insertion part into which a pipe is to be inserted, the pipe insertion part being configured by a resin material with greater softness and elasticity than a material configuring the joint body, and the pipe insertion part being integrated with the joint body;

an annular tightening member disposed at an outer circumferential of the pipe insertion part, the tightening member tightening the pipe insertion part from an outer circumferential side thereof by a tightening operation; and a restriction part provided at the pipe insertion part, the restriction part:

blocking movement relative to the pipe insertion part of the tightening member before the tightening operation in an axial direction of the pipe insertion part, and restricting rotation relative to the pipe insertion part of the tightening member before the tightening operation in a circumferential direction of the pipe insertion part, wherein the restriction part includes support parts that:

rise from an outer circumferential face of the pipe insertion part, are provided spaced apart in the circumferential direction of the pipe insertion part, and support the tightening member from an inner circumferential side thereof before the tightening operation.

2. The pipe joint according to claim 1, wherein:

the restriction part includes a pair of protruding parts that protrude from an outer circumferential face of the pipe insertion part and are provided spaced apart in the axial direction, the tightening member is disposed between the pair of protruding parts, and two width direction end portions of the tightening member respectively contact the pair of protruding parts.

3. The pipe joint according to claim 2, wherein:

projecting parts that project in directions towards one another are respectively provided at the pair of protruding parts, and the tightening member is disposed between the pair of projecting parts and the outer circumferential face of the pipe insertion part.

4. The pipe joint according to claim 3, wherein the projecting parts contact an outer circumferential face of the tightening member before the tightening operation.

5. The pipe joint according to claim 2, wherein:

one support part among a plurality of the support parts is provided between the pair of protruding parts.

6. The pipe joint according to claim 1, wherein an expanded diameter part at which an inner diameter of the pipe insertion part increases is provided at a portion of the pipe insertion part that is at a deeper side in an insertion direction of the pipe relative to a region to be tightened by the tightening member.

7. The pipe joint according to claim 6, wherein an inner circumferential of at least a portion of the pipe insertion part corresponding with the region to be tightened is a constant diameter part.

8. The pipe joint according to claim 1, wherein the joint body is configured by a fiber-reinforced resin and the pipe insertion part is configured by a thermoplastic elastomer.

9. The pipe joint according to claim 1, wherein the joint body includes a pipe connection part to be connected to a pipe-shaped member.

* * * * *